United States Patent Office 2,901,476
Patented Aug. 25, 1959

2,901,476

STILBENE TRIAZOLES

Heinrich Gold, Opladen, and Otto Bayer, Leverkusen-Bayerwerk, Germany, assignors to Farbenfabriken Bayer Aktiengesellschaft, Leverkusen, Germany, a corporation of Germany No Drawing. Application June 12, 1956
Serial No. 590,807

Claims priority, application Germany June 15, 1955

6 Claims. (Cl. 260—240)

The present invention relates to stilbene triazoles and to a process of producing the same; more particularly it concerns stilbene triazoles which correspond to the general formula (I)

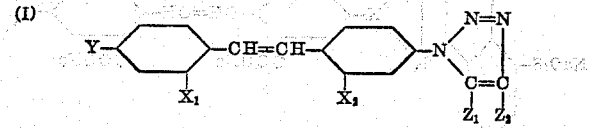

wherein $X_1$ and $X_2$ stand for hydrogen, a solubilizing group, such as a sulfo or carboxyl group, a sulfonamide group, an alkyl sulfone group, an aryl sulfone group, a carbonyl amide group or a nitrile group, whereas Y stands for hydrogen, halogen, nitrile group, an acylamino group or a triazinyl or triazolyl group which may be substituted, whilst $Z_1$ and $Z_2$ represent hydrogen, an alkyl group, an alkoxy group, an aryl group or an esterified carboxyl group.

Representatives of the stilbene triazoles of the present invention are for example the following compounds:

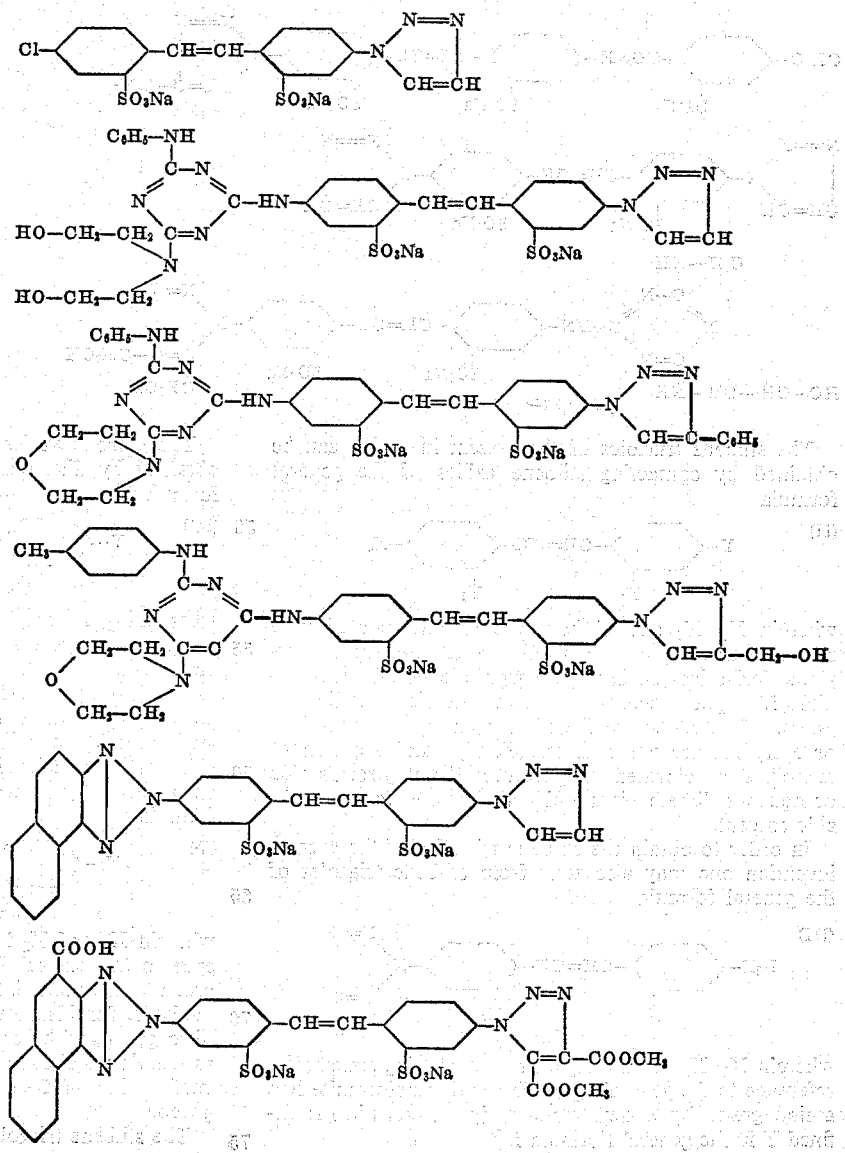

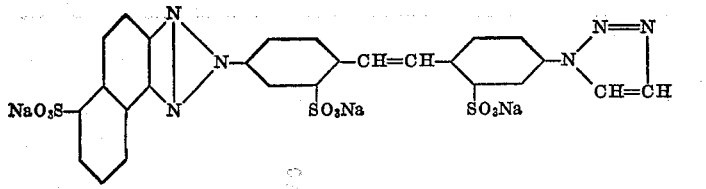

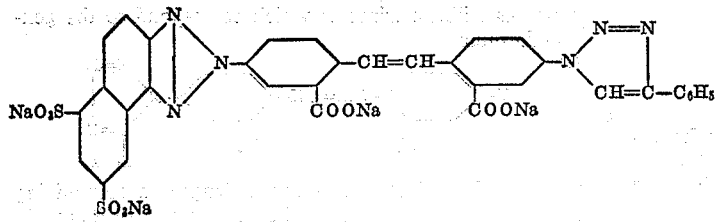

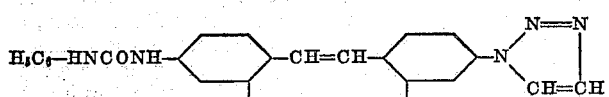

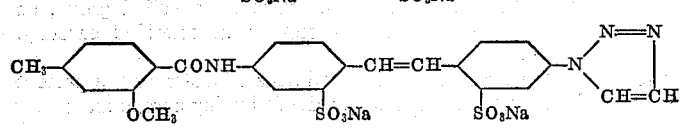

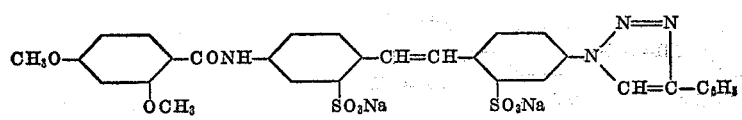

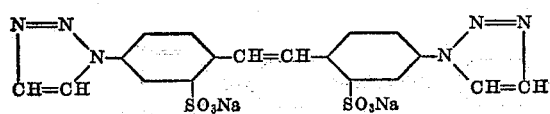

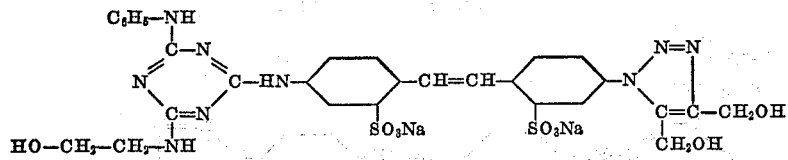

The stilbene triazoles of the present invention can be obtained by contacting stilbene azides of the general formula (II) 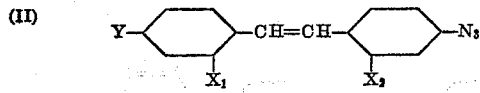

wherein $X_1$, $X_2$ and Y have the meaning stated with reference to the general Formula I and acetylene or acetylene derivatives such as propargyl alcohol, butine-(2)-diol-(1,4), phenylacetylene or acetylene dicarboxylic acid esters. The reaction of the stilbene azides with acetylene or acetylene derivatives is expediently carried out in an autoclave at elevated temperature; dimethylformamide or aqueous dimethylformamide has proved to be a suitable solvent.

In order to obtain the stilbene triazoles of the present invention one may also start from stilbene triazoles of the general formula (III) 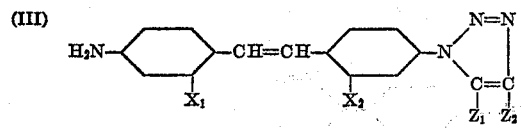

wherein $X_1$, $X_2$, $Z_1$ and $Z_2$ have the meaning stated with reference to the general Formula I and transform the free amino group by known methods into a substituent defined Y in the general Formula I.

The stilbene azides of the general Formula II can be obtained by diazotizing stilbene amines of the general formula (IV) 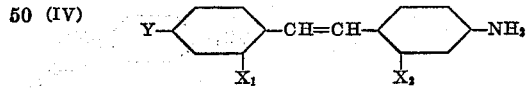

wherein $X_1$, $X_2$ and Y have the meaning stated with reference to the general Formula I and reacting the diazo compounds with the amides of aromatic sulfonic acids such as p-toluene sulfonic acid amide or by reducing the diazo compounds to the hydrazine compounds and subjecting the latter to the action of nitrous acid.

The stilbene triazoles of the general Formula III can be obtained by contacting stilbene azides of the general formula (V) 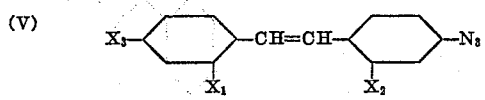

wherein $X_1$ and $X_2$ have the meaning stated with reference to the general Formula I whereas $X_3$ stands for a group convertible into a free amino group by known methods, for instance for an acylamino group or for a nitro group, with acetylene or acetylene derivatives such as mentioned above and finally converting the group convertible into a free amino group into the free amino group.

The stilbene triazoles of the present invention are valuable compounds; they may serve for instance as intermediates for the manufacture of dyestuffs. Furthermore, they are particularly suitable as brightening agents. For this purpose they are employed in usual manner, generally in the form of solutions in water or organic solvents; they may also be used along with detergents. The required amounts may easily be ascertained by preliminary tests.

The following examples serve to illustrate the invention without, however, limiting the scope thereof; the parts are by weight.

*Example 1*

47 parts of the sodium salt of 4-azido-4'-nitrostilbene-2,2'-disulfonic acid are heated in 300 parts of dimethylformamide in an autoclave under a pressure of 20 atm. of a mixture of acetylene and nitrogene gas, at a partial pressure of acetylene of 10 atm., to 100° C. for 24 hours. The solution is then allowed to cool and treated with 600 parts of a 20% sodium chloride solution; thereby, the sodium salt of 4-[triazolyl-(1)]-4'-nitrostilbene-2,2'-disulfonic acid separates out as light-yellow platelets; it is filtered off with suction, washed with a 20% sodium chloride solution and dried.

49.6 parts of the sodium salt of 4-[triazolyl-(1)]-4'-nitrostilbene-2,2'-disulfonic acid thus obtained are heated with 70 parts of iron turnings in 500 parts of 2% acetic acid to 80–90° C. for 2 hours; the hot solution is then treated with 15 parts of sodium carbonate and filtered. After the addition of 150 parts of sodium chloride the sodium salt of 4-[triazolyl-(1)]-4'-aminostilbene-2,2'-disulfonic acid precipitates out from the filtrate as light-yellow coloured crystals.

The sodium salt of 4-[triazolyl-(1)]-4'-nitrostilbene-2,2'-disulfonic acid may also be obtained in the following manner:

47 parts of the sodium salt of 4-azido-4'-nitrostilbene-2,2'-disulfonic acid are dissolved in 450 parts of water and the solution is heated in an autoclave under a pressure of 20 atm. of a mixture of acetylene and nitrogen gas, at a partial pressure of acetylene of 12 atm., to 100° C. for 4 hours. On cooling the content of the autoclave the larger portion of the sodium salt of 4-[triazolyl-(1)]-4'-nitrostilbene-2,2'-disulfonic acid begins to crystallize; by the addition of about 80 parts of sodium chloride a further amount of this product can be precipitated.

The sodium salt of 4-azido-4'-nitrostilbene-2,2'-disulfonic acid applied in this example had been prepared in the following way:

An aqueous solution of 44.4 parts of the sodium salt of 4-amino-4'-nitrostilbene-2,2'-disulfonic acid in 400 parts of water was treated with a solution of 6.9 parts of sodium nitrite in 30 parts of water and poured into a mixture of 21 parts of concentrated hydrochloric acid and 100 parts of ice. When the diazotizing was completed, the suspension thus obtained was poured into a solution of 17.5 parts of p-toluene-sulfonic acid amide in 100 parts of a 4% caustic soda solution, the reaction product was precipitated by the addition of 120 parts of sodium chloride, filtered off with suction and washed with a 20% aqueous sodium chloride solution. After drying, 45 parts of the sodium salt of 4-azido-4'-nitrostilbene-2,2'-disulfonic acid were obtained as an orange-coloured powder.

*Example 2*

48.2 parts of the sodium salt of 4-azido-4'-acetylaminostilbene-2,2'-disulfonic acid—prepared by diazotizing 4-amino-4'-acetylaminostilbene-2,2'-disulfonic acid and by treating the diazo compound with p-toluene-sulfonic acid amide—are dissolved in 300 parts of dimethylformamide and reacted with acetylene as described in Example 1. The sodium salt of 4-[triazolyl-(1)]-4'-acetylaminostilbene-2,2'-disulfonic acid is thus obtained as a light yellow powder.

*Example 3*

A solution of 47 parts of the sodium salt of 4-azido-4'-nitrostilbene-2,2'-disulfonic acid in 250 parts of water is treated with 11.2 parts of propargyl alcohol and heated to 95–100° C. for 24 hours. After cooling the sodium salt of 4-[4'-hydroxymethyl-triazolyl-(1')]-4'-nitrostilbene-2,2'-disulfonic acid crystallizes out. It is completely precipitated by the addition of a 20% sodium chloride solution, filtered off with suction, washed with a 20% sodium chloride solution and dried. Yield 42 parts.

*Example 4*

A solution of 47 parts of the sodium salt of 4-azido-4'-nitrostilbene-2,2'-disulfonic acid in 300 parts of dimethylformamide is treated with 20 parts of phenylacetylene and heated on a water bath for 24 hours. On the addition of 600 parts of a 20% sodium chloride solution the sodium salt of 4-[4'-phenyl-triazolyl-(1'—)]-4'-nitrostilbene-2,2'-disulfonic acid precipitates as a yellow powder. It is filtered off with suction, washed with water and dried.

*Example 5*

1 mol of cyanuric chloride is condensed in aqueous acetone first with 1 mol of the sodium salt of 4-amino-4'-[triazolyl-(1')]-stilbene-2,2'-disulfonic acid and then with 1 mol of aniline. Finally the sodium salt of 4-[2'-phenlyamino-4'-chlorotriazinyl-(6')-amino]-4'-[triazolyl-(1')]-stilbene-2,2'-disulfonic acid formed is boiled with excess diethanolamine. Thus the sodium salt of 4-[2'-phenylamino-4'-di-($\beta$-hydroxyethyl)-amino-triazinyl-(6')-amino]-4'-[triazolyl-(1')]-stilbene-2,2'-disulfonic acid is obtained.

*Example 6*

A solution of 46.8 parts of the sodium salt of 4-amino-4'-[triazolyl-(1')]-stilbene-2,2'-disulfonic acid in 200 parts of water is treated with a solution of 6.9 parts of sodium nitrite in 20 parts of water and cooled to 5° C. After the addition of 20 parts of concentrated hydrochloric acid the mixture is stirred for 1 hour and then coupled by the addition of a solution of 19 parts of 2-amino-naphthalene-3-carboxylic acid in 100 parts of a 4% caustic soda solution. After the coupling is complete, a further 100 parts of a 4% caustic soda solution are added; the reaction mixture is then heated to 70–80° C. and treated with 120 parts of a sodium hypochlorite solution containing 17 percent of active chlorine. When the oxidation is complete, the suspension thus obtained is treated with 50 parts of sodium chloride, the precipitated sodium salt of 4-[3-carboxynaphtho-(1.2;4'.5')-triazolyl-(2')]-4'-[triazolyl-(1')]-stilbene-2,2' - disulfonic acid is filtered off with suction at room temperature, washed with dilute sodium chloride solution and dried.

*Example 7*

72 parts of the sodium salt of 4-azido-4'-[5-sulfonaphtho - (1.2;4'.5')-triazolyl-(2')] - stilbene-2,2-disulfonic acid are dissolved in 400 parts of dimethylformamide and heated in an autoclave under a pressure of 20 atm. of a mixture of acetylene and nitrogen gas at a partial acetylene pressure of 10 atm. to 100° C. for 24 hours. After cooling the reaction mixture is treated with 600 parts of a 20% sodium chloride solution; thereby the sodium salt of 4-[triazolyl-(1')]-4'-[5-sulfonaphtho(1.2;4'.5') - triazolyl-(2')]-stilbene-2,2'-disulfonic acid is precipitated as pale yellow crystals; it is filtered off with suction, washed with a 20% sodium chloride solution and dried.

*Example 8*

An unbleached cotton fabric is treated for 30 minutes at 40–50° C. with a solution containing 0.01–0.02 gram per litre of the sodium salt of 4-[2'-phenylamino-4'-di-($\beta$-hydroxyethyl)-amino-triazinyl-(6') - amino] - 4'[triazolyl-(1')]-stilbene-2,2'-disulfonic acid obtained according to Example 5. To afford better use of the bath there may be added sodium chloride or sodium sulfate. After washing and drying, the cotton fabric has the appearance of bleached goods. The brightening thus obtained distinguishes itself by a clear white tint free from any red cast and having a good fastness to washing and chlorine.

Example 9

100 parts of curd soap are homogeneously mixed with 0.02 part of the sodium salt of 4-[3-carboxynaphtho-(1.2;4'.5') - triazolyl-(2')]-4'-[triazolyl-(1')] - stilbene - 2,2'-disulfonic acid prepared according to Example 6. The soap thus obtained has in daylight a whiter appearance than the untreated soap. The brightening excels in a neutral white tint which is fast to light.

Example 10

100 parts of white laundry goods are washed at 90–100° C. with 2000 parts of a washing liquor containing in addition to 20 parts of a usual detergent 0.1 part of the sodium salt of 4-[triazolyl-(1')]-4'-[5-sulfonaphtho-(1.2;4'.5)-triazolyl-(2')]-stilbene-2,2'-disulfonic acid obtained according to Example 7. After rinsing and drying the white laundry goods thus washed have a substantially whiter appearance than when treated without the brightening agent.

We claim:
1. The stilbene triazole of the formula

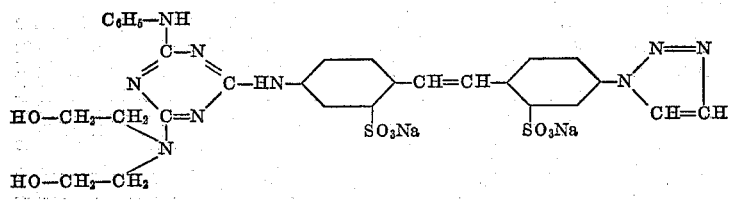

2. The stilbene triazole of the formula

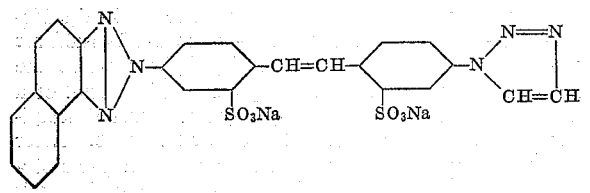

3. The stilbene triazole of the formula

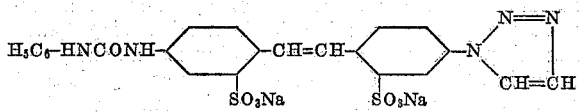

4. The stilbene triazole of the formula

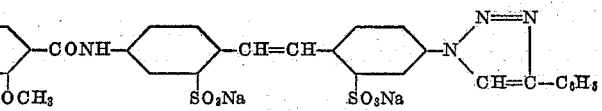

5. Stilbene triazoles of the general formula

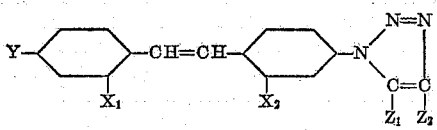

wherein $X_1$ and $X_2$ stand for a member of the group consisting of sulfo and carboxyl; Y stands for a member of the group consisting of hydrogen, halogen, phenylcarbamoylamino, methoxy-methyl-benzoyl-amino, methoxy-benzoylamino, acetylamino, triazinyl, and triazolyl; and $Z_1$ and $Z_2$ represent a member of the group consisting of hydrogen, lower alkyl, lower alkoxy, phenyl, and

where R is lower alkyl.

6. The stilbene triazole of the formula

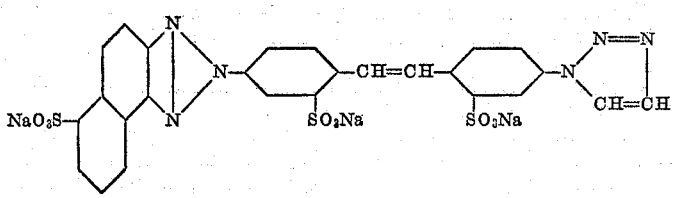

References Cited in the file of this patent
UNITED STATES PATENTS

| | | |
|---|---|---|
| 2,475,136 | Heimbach | July 5, 1949 |
| 2,503,709 | Brooker | Apr. 11, 1950 |
| 2,624,710 | Thomas | Jan. 6, 1953 |
| 2,667,458 | Adams | Jan. 26, 1954 |